United States Patent [19]

Lando et al.

[11] 4,044,162
[45] Aug. 23, 1977

[54] DECAFFEINATED COFFEE OF IMPROVED FLAVOR

[75] Inventors: Frank Lando, Wayne, N.J.; Charles Leonard Teitelbaum, New York, NY

[73] Assignee: General Foods Corporation, White Plains, N.Y.

[21] Appl. No.: 415,924

[22] Filed: Nov. 14, 1973

[51] Int. Cl.² .............................................. A23F 1/10
[52] U.S. Cl. ................................ 426/427; 426/428; 426/595
[58] Field of Search ............... 426/427, 428, 321, 323, 426/352, 354, 377, 378, 442, 595

[56] References Cited

U.S. PATENT DOCUMENTS

| 997,431 | 7/1911 | Winter | 426/354 |
|---|---|---|---|
| 3,671,263 | 6/1972 | Patel et al. | 426/428 |
| 3,682,648 | 8/1972 | Mitchell et al. | 426/428 |
| 3,740,230 | 6/1973 | Mahlmann | 426/428 |

FOREIGN PATENT DOCUMENTS 388,699  3/1933  United Kingdom ................. 426/354

OTHER PUBLICATIONS

*Coffee Processing Technology*, by Sivetz and Foote, vol. 1, published by Avi Pub. Co., Westport, Conn. 1963, p. 231.
"Handbook of Food and Agriculture" by Fred C. Blank, Reinhold Publishing Co., N. Y., 1955.

*Primary Examiner*—Frank W. Lutter
*Assistant Examiner*—N. Greenblum
*Attorney, Agent, or Firm*—Thomas R. Savoie; Bruno P. Struzzi

[57] ABSTRACT

The flavor and aroma of decaffeinated coffee is made to more closely resemble that of undecaffeinated coffee by virtue of a process involving contacting green coffee with sucrose.

6 Claims, No Drawings

DECAFFEINATED COFFEE OF IMPROVED FLAVOR

BACKGROUND OF THE INVENTION

This invention relates to decaffeinated coffee and, more particularly, to a process for preparing decaffeinated coffee of improved flavor.

Prior art workers have long been concerned with the adverse effects that commercial decaffeination methods have on the green coffee so treated, causing the finished decaffeinated product to lack, to varying degrees, the flavor and aroma of its undecaffeinated counterpart.

Attempts at preparing decaffeinated coffee which is more nearly akin to undecaffeinated coffee in flavor and aroma have ranged from improving the decaffeination process itself to the overt addition of either natural or synthetic coffee aromas to the decaffeinated product. In general, decaffeination processes involve either "water extraction" or "solvent extraction" methods. Either method may be operated in batch, semi-continuous or continuous fashion. For example, U.S. Pat. No. 2,309,092 to Berry, et al. describes a continuous water decaffeination process wherein caffeine-containing green coffee is countercurrently extracted with a water solution. U.S. Pat. Nos. 3,671,262 and 3,671,263 describe, respectively, batch and continuous decaffeination methods using an organic solvent as the extraction medium.

The particular processes employed and various operating parameters such as temperature, pressure, and flow rate have all been extensively varied and optimized throughout the years in order to minimize the deleterious effect of the caffeine extraction process on the green coffee. However, an important balancing factor which must be considered against these desirable results is the need for achieving efficient extraction of the caffeine from the green coffee material. Thus, for example, while low temperatures may reduce flavor loss in decaffeinated green coffee, it is generally at the expenses of decreased caffeine extraction efficiency.

It is the primary object of this invention to improve the flavor of decaffeinated coffee in the direction of closely matching the flavor of undecaffeinated coffees. Another object of this invention is to achieve the above flavor improvement without a corresponding decrease in caffeine extraction efficiency.

Yet another object is to achieve these desirable results utilizing a process adaptable to a wide variety of extraction processes and extraction conditions.

These and other objects will become more apparent in light of the specification and claims which follow.

SUMMARY OF THE INVENTION

It has been found that decaffeinated coffee of a flavor closely approximating that of undecaffeinated coffee can be prepared by a process involving contacting green coffee with sucrose.

In accordance with this invention caffeine-containing green coffee is contacted with an extraction medium to effect caffeine removal. The green coffee is contacted with sucrose before contact with the extraction medium is terminated. The extraction medium may be an organic solvent capable of extracting caffeine, water, or a water solution as will be hereinafter described.

The process of this invention is applicable to both water and solvent decaffeination process and to either batch, continuous, or semi-continuous modes of operation.

In a preferred embodiment of this invention, a countercurrent continuous water decaffeination system such as described in Berry, et al. is employed and sucrose is added to the extraction liquid used to extract the caffeine from the green coffee. Other embodiments of this invention include addition of sucrose to the extraction liquid used in a batch water decaffeination system, and contacting green coffee with a sucrose solution at various points in both batch and continuous solvent decaffeination processes. Contacting caffeine-containing green coffee with sucrose before the coffee is contacted with the caffeine extraction medium is also described hereinafter.

It has been found that green coffee during decaffeination loses a substantial amount of its sucrose content to the surrounding extraction liquid and further, that a portion of the sucrose undergoes chemical inversion during decaffeination to invert sugar, thereby further altering the natural sucrose content of the green coffee.

In studying products prepared from undecaffeinated coffees it has been found that much of the characteristic flavor of these products is due to sucrose degradation products produced during roasting. As will be more fully discussed hereinafter, the process of this invention, which results in the decaffeinated coffees having an increased amount of sucrose, is found to result in decaffeinated coffee products of improved flavor when brewed.

DETAILED DESCRIPTION OF THE INVENTION

The process of this invention concerns a method of decaffeinating coffee wherein caffeine-containing green coffee is contacted with an extraction medium to effect caffeine removal. It has been found that the flavor and aroma of the final decaffeinated coffee product whether it be roasted and ground or soluble coffee can be improved by contacting the green coffee with sucrose before contact with the caffeine extraction medium is terminated.

The meaning of the above terminology will become more apparent from the ensuing description of the invention. Thus in a countercurrent multi-stage caffeine extraction system as will be described in more detail hereinafter, employing either water extraction or solvent extraction techniques, "before contact of the green coffee with the caffeine extraction medium is terminated" is intended to mean a point prior to discharging the most extracted coffee from the extraction system after it has been contacted with the extraction medium. In a single stage system such terminology is intended to mean some point before the green coffee is discharged from the extraction vessel after having been contacted with extraction liquid for the last time. Such terminology is also intended to include contacting caffeine-containing green coffee with sucrose before the coffee is contacted with the extraction medium, i.e., before the coffee undergoes any caffeine extraction.

Green coffee according to this invention may be a blend of coffee varieties or a single coffee variety and may either be whole beans or some subdivided form thereof.

The preferred method of practicing this invention involves a continuous water decaffeination system such as described in Berry, et al. U.S. Pat. No. 2,309,092 patented Jan. 26, 1943 and incorporated herein by reference. Caffeine is extracted with an aqueous extraction liquid from green coffee contained in a battery of extraction columns connected in series. At continuous operation, the extraction columns contain green coffee of varying degrees of extraction and the process is counter-current in operation.

At continuous operation, the extraction columns contain green coffee of varying degrees of freshness (extraction). The aqueous extraction liquid is fed to the extraction column containing the most extracted green coffee, passes through the coffee extracting caffeine therefrom, and passes out of the column into the extraction column containing the next most extracted green coffee in the battery. In this manner, the extraction liquid passes through green coffee of increasing freshness, thereby increasing in caffeine content, and is drawn-off from the extraction column containing the least extracted coffee in the battery for this cycle. (Cycle being the period between successive draw-offs of extraction liquid from the fresh column). The extraction liquid is then processed to remove caffeine as described in Berry et al. U.S. Pat. No. 2,309,092.

In beginning a new cycle, the most extracted green coffee in the previous cycle is discharged from the extraction column and is in the desired final decaffeinated form. This coffee is then further processed into roasted and ground coffee or soluble coffee according to methods well-known in the art. The aqueous extraction liquid is then fed to the column containing the most extracted green coffee for this cycle, this coffee being the next most extracted coffee from the previous cycle, and the extraction process continues with the caffeine-laden extraction liquid being drawn off after contacting the freshest green coffee for this cycle which is generally unextracted green coffee. Cycles are continued in this manner such that in each succeeding cycle a given column of green coffee becomes progressively more extracted and hence deficient in caffeine.

An important feature of the Berry, et al. process is the make-up of the extraction medium. It is found that in a water decaffeination process, green coffee constituents other than caffeine are extracted from the green coffee during the decaffeination process many of which are believed responsible, in part, for the characteristic flavor of undecaffeinated coffee. Some prior art workers have attempted to reincorporate these removed soluble constituents into the decaffeinated coffee; however, it is generally found that such a procedure fails to yield desirable flavor improvements.

In Berry, et al., the aqueous extraction liquid fed to the first extraction column in the battery containing the most extracted green coffee, is a water solution of green coffee solubles other than caffeine, generally in the range of about 15% by weight. In this manner, a continuous dynamic equilibrium is substantially maintained between the solids (other than caffeine) in the green coffee and the solids in the extraction liquid. This equilibrium inhibits the net loss of green coffee solubles from the coffee to the surrounding water and, hence, the final decaffeinated green coffee is found to contain nearly the normal amount of solubles other than caffeine.

Of course, as the extraction liquid passes through the battery of extraction columns it will become progressively more caffeine-laden. While many varying concentrations of these green coffee solubles in the extraction liquid may be employed, the concentrations and other operating factors are generally chosen so as to achieve, as nearly as possible, the dynamic equilibrium previously referred to.

The equilibrium between the soluble solids in the green coffee and the soluble solids in the extraction liquid works to minimize any concentration gradients of these materials and thereby hinders net mass transfer from the coffee to the surrounding liquid. Since caffeine is not initially present in the extraction liquid, a suitable gradient is present to effect extraction of the caffeine from the green coffee into the extraction liquid. In actuality the dynamic equilibrium is more aptly described as equal rates of mass transfer. Thus while the net ideal result is to substantially prevent a reduction of the original amount of solubles other than caffeine in the green coffee such prevention is the result of a combination of preventing natural solubles loss from the green coffee coupled with replacement of solubles from the extraction liquid at a rate equal to the rate of solubles lost from the green coffee.

An important key to this embodiment of our invention and the preferred method of effecting sucrose contact of the green coffee prior to final decaffeination is the addition of sucrose to the extraction liquid used in the decaffeination process. By virtue of the presence of sucrose in the extraction liquid, a substantial net reduction in the original sucrose content of the green coffee is avoided. As previously discussed, this reduction in sucrose content is avoided in this preferred embodiment via a combination of retention of the original sucrose of the green coffee together with replacement of lost sucrose by that present in the extraction liquid.

In the Berry, et al. patent, the extraction liquid drawn off from the extraction column containing the least extracted green coffee contains caffeine and green solubles either present in the original feed liquid or extracted from the green coffee. The extraction liquid is stripped of caffeine, generally with solvent, and the solvent is removed from the remaining solution. The liquid present after solvent removal may then be reincorporated into the feed extraction liquid storage tank. As such it will be noted that the extraction liquid described in the Berry, et al. process may contain amounts of sucrose extracted from the green coffee during the decaffeination process. However, we have found that the sucrose that may be present is insufficient to prevent a reduction in the sucrose content of the green coffee during subsequent decaffeination using this liquid. It is theorized that this is due not only to the fact that not enough sucrose is present but also, more importantly because the sucrose present, extracted from the green coffee, has been altered substantially during the steps of solvent extraction, solvent removal, etc. Thus, it has been found necessary to add sucrose to the extraction liquid used in any cycle.

The amount of sucrose added to the extraction liquid is dependent upon a variety of factors. The amount added should be such that a substantial net reduction of the original sucrose content of the green coffee is prevented during decaffeination. Thus, dependent factors are the original sucrose content of the green coffee, the contact residence time of coffee with liquid, and other like considerations. It is believed within the skill of those in this art to determine the proper amounts to be added for any given cycle. In general, the sucrose content of coffee decaffeinated according to current methods is about 5% by weight and lower. In accordance with this invention, sucrose is added to the extraction liquid in an amount sufficient to result in a final sucrose content of at least about 6% by weight in the decaffeinated green coffee and preferably between 6% to 9% by weight. In general, depending in part upon the variety of factors above mentioned, such a final sucrose content can be achieved through the addition of from about 2% to 25% sucrose by weight of the extraction liquid and preferably between 3% and 10% by weight. It will be appreciated that addition of lesser amounts, while perhaps not achieving the most ideal results, will result in some protection against the reduction of the sucrose content of the green coffee during decaffeination and hence, flavor improvements are perceived. Large amounts of sucrose are generally unnecessary and are balanced mainly against the undesirability of infusing substantial additional amounts of sucrose into the green coffee. Large amounts of sucrose tends to increase the acid sour character of the final coffee product.

In the foregoing process the sucrose can be added to the extraction liquid at various points in the process. Preferably the sucrose is added to the extraction liquid just before it enters the extraction columm containing the most extracted green coffee. In this embodiment the amount of sucrose added is ideally sufficient to result in the previously referred to equilibrium situation throughout the battery of extraction columns.

In the foregoing embodiment it can be seen that the caffeine-containing green coffee is contacted with sucrose in all cycles, i.e., from the time a given batch of green coffee is placed on-stream to the time it is removed from the system as fully decaffeinated coffee. In certain instances it has been found desirable to effect the sucrose contacting step at some point after the green coffee has been partially decaffeinated with the normal extraction liquid. Possible chemical alterations of the sucrose during the decaffeination process may lead to flavor deviations from the undecaffeinated coffee target. Thus, alternatively, sucrose can be added to the extraction liquid just before contacting the most fully decaffeinated coffee in the battery in an amount such that substantially all the added sucrose is infused into the coffee. The extraction liquid exiting this column then contains little sucrose in addition to the amount generally present in such an extraction liquid. Accordingly, the fresher or less extracted coffees in the battery contacted with this liquid will lose the normal amount of sucrose. Upon becoming the most extracted coffee in a cycle such coffee will have its sucrose content increased to between 6% to 9% by weight by virtue of being contacted with an aqueous extraction liquid with added sucrose. This type operation is ideally suited where continuous co-current or batch methods are employed. For example, in a batch type operation, a single column of green coffee is contacted with the aqueous extraction liquid. While single-pass operation has been employed, it is generally necessary to continuously recycle the extraction liquid exiting from the column back through the column until the coffee contained therein has had the desired amount of caffeine removed. In this embodiment of the invention, then, sucrose addition to the extraction liquid is not made until some point after the coffee has been partially decaffeinated. Generally, sucrose is added to the contacting extraction liquid after the beans have been about half decaffeinated, and preferable in either the last or next-to-last pass of extraction liquid through the green coffee. It will be noted that in this embodiment, replacement of lost sucrose is dominant as opposed to retention of the original sucrose in the coffee. The net effect, ideally, is that the final decaffeinated coffee contains nearly the same amount of sucrose as its undecaffeinated green counterpart.

Where the decaffeination process employs a recycle of extraction liquid after having passed through a single column or a battery of columns addition of sucrose may of course be made to this recycled liquid before it is mixed with "normal" extraction liquid. Such recycled liquid is intended to be included in the terminology of aqueous extraction liquid.

Another means for preventing a reduction in the sucrose content of the green coffee during decaffeination by effecting sucrose contact is impregnating the green coffee with sucrose prior to decaffeination. By thus increasing the natural sucrose content of the green coffee, the decaffeination process sets up its own equilibrium. That is, sucrose will be lost to the surrounding extraction liquid until the concentration of sucrose in the liquid approaches that remaining in the green coffee, and further sucrose net loss will then be at a minimum. The additional sucrose added prior to decaffeination can be adjusted such that equilibrium during decaffeination will occur approximately at a point where the green coffee now contains nearly its original amount of sucrose (the amount present prior to sucrose addition).

While this embodiment is effective to some extent, problems exist mainly in the impregnation or infusion process wherein somewhat extreme conditions of either temperature or contact time may be necessary in order to infuse the needed amount of sucrose into the coffee; the result is a possible deleterious effect on the green coffee treated (especially since the green coffee undergoes yet another substantial "soaking" process during decaffeination). Accordingly, addition of sucrose to the extraction liquid itself is the preferred method of practicing this invention when water decaffeination is used.

The above method, however, may be particularly useful where a solvent decaffeination system is used, i.e. where the extraction medium is an organic caffeine solvent. The basic steps of solvent decaffeination, as set-out in the patents previously referred to, are steaming, pre-wetting, caffeine extraction, solvent stripping from the decaffeinated coffee, and drying and cooling. In the pre-wetting step, water is added to the previously steamed coffee to increase the total moisture content to about 30% to 45% by weight. Generally, pre-wetting is conducted in the same extraction vessel in which decaffeination is performed. Sucrose addition to the pre-wetting water affords a means of increasing the sucrose content of the green coffee prior to decaffeination and can be conducted such that sucrose loss during decaffeination "levels off" at nearly the original sucrose content as discussed above. The above-referred to disadvantages of this method, namely, excessive additional soaking, do not now enter into consideration since this pre-soaking is performed regardless of whether sucrose contact is desired.

In point of fact, where a solvent decaffeination process is involved the above is our preferred means of contacting the green coffee with sucrose. Some of the organic caffeine solvents employed in solvent extraction are not suitable carriers for sucrose. Hence, depletion of the natural sucrose content of the beans during decaffeination, it is theorized, is due not so much to transfer of the sucrose from the bean to the surrounding extraction medium, as is the case with a water extraction process, but rather due to chemical inversion of the sucrose within the bean brought about by contact with the organic solvent. Where such is the case, addition of sucrose to the organic solvent is a less effective means of arriving at the desired final sucrose content since the solvent is a poor carrier for the sucrose.

Alternate means of pre-wetting involve adding all or part of the pre-wetting water simultaneously with the solvent used for caffeine extraction. Sucrose addition to the pre-wetting water may be practiced equally well in this operation. It should be noted, of course, that the process of this invention as applied to solvent decaffeination systems is applicable to both batch and continuous systems.

Where pre-wetting is used in a water decaffeination process, sucrose addition to the pre-wetting water to effect contact of the green coffee with sucrose is equally possible and is no longer attended with the disadvantages above-referred to since "pre-soaking" is performed regardless of whether sucrose contact is desired.

While not within the ambit of this invention, sucrose addition to already fully decaffeinated coffee may be effective to some extent in restoring the original sucrose content of the green coffee, depleted during decaffeination. Similar infusion problems as discussed above render this in some cases a less desirable mode of operation. Green decaffeinated coffee, for example, may be simply allowed to soak in a sucrose solution for a period of time sufficient to raise the sucrose content of the coffee to between about 6% to 9% by weight. Where a washing step, such as described in Berry, et al. is employed to wash extraction liquid from the finally decaffeinated coffee, sucrose addition to this wash water may be employed to restore the sucrose lost during decaffeination. The degree of sucrose replacement possible, however, will be limited to the contact time of the washing step which is generally not extremely prolonged. More importantly, however, any sucrose left to remain on the surface of the bean may substantially interfere with the color and flavor development during roasting.

It should also be noted that combinations of the various alternative means for effecting sucrose contact with the green coffee prior to final decaffeination of the green coffee may be employed instead of a single means.

In all the numerous embodiments given with respect to the process of this invention the amount of sucrose either added to extraction liquid, or pre-wetting liquid or after final decaffeination is such that the sucrose context of the finally decaffeinated green coffee is from about 6% to about 9% by weight.

As is apparent from the description of this invention, the decaffeination process also affords an excellent means of either preventing reduction during decaffeination in the amount of materials other than sucrose present in the original green coffee or impregnating decaffeinated coffee with materials not originally present in the green coffee (or present in amounts desired to be increased). Thus, the loss of natural green coffee materials to the surrounding extraction liquid during decaffeination such as trigonelline, and minerals such as copper, iron, magnesium calcium, sodium, and their salts, believed to contribute to the desirable flavor of roasted coffee, but lacking to varying degrees in decaffeinated coffees due to loss to the surrounding extraction liquid during the decaffeination process, can be substantially prevented by adding amounts of these materials to the aqueous extraction liquid or during a pre-wetting operation. Also it is possible to infuse constituents not naturally present in green coffee according to the process of this invention such as fructose or glucose.

The preferred embodiment of process of this invention is illustrated by the following example. An undecaffeinated green coffee blend of 450 grams was contacted with an extraction liquid containing green coffee solubles other than caffeine and 10% sucrose by weight of the extract. The extraction was performed at 180° F for 5½ hours. As a control sample, an equivalent quantity of the same green coffee blend was contacted with equivalent amounts of the same extraction liquid, except that no sucrose had been added thereto, and extraction proceeded at identical temperatures and times.

The contacted beans were separated from the extraction liquid, washed with water, dried in a forced air oven to 8% – 10% moisture, and roasted in a solid shell roaster. Brew infusions prepared from these samples were tasted by an expert panel with the experimental sample judged more flavorful than the control sample in that it was more nearly akin to undecaffeinated coffees.

While this invention has been described with respect to certain examples and preferred embodiments they are not intended to be limiting in any way. It is believed that obvious variations and alterations of the invention described may be achieved without departing from the scope and spirit of this invention.

What we claim is:

1. In a method of decaffeinating coffee wherein caffeine-containing green coffee is contacted with an extraction medium comprised of a water extract of green coffee solubles to effect caffeine removal from said coffee, the improvement comprising adding sucrose to said extraction medium in an amount sufficient to result in a decaffeinated green coffee having at least about 6% sucrose by dry weight.

2. The method of claim 1 wherein said decaffeinated green coffee has a sucrose content of between about 6% to 9% by dry weight.

3. The method of claim 1 wherein sucrose is added to said extraction medium in an amount between 3% and 20% by weight of said extraction medium.

4. The method of claim 3 wherein sucrose is added to said extraction medium in an amount between 3% and 10% by weight of said extraction medium.

5. The method of claim 4 wherein said caffeine-containing green coffee is contained in a battery of extraction columns and wherein said extraction medium flows countercurrently through extraction columns containing progressively less extracted green coffee.

6. The method of claim 4 wherein said caffeine-containing green coffee is contained in a single extraction column, said extraction medium being continuously recycled through said coffee, and wherein said sucrose is added after said green coffee has been about half decaffeinated.

* * * * *